(12) United States Patent
Poisner et al.

(10) Patent No.: US 7,076,669 B2
(45) Date of Patent: Jul. 11, 2006

(54) METHOD AND APPARATUS FOR COMMUNICATING SECURELY WITH A TOKEN

(75) Inventors: David I. Poisner, Folsom, CA (US); David W. Grawrock, Aloha, OR (US); James A. Sutton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 10/122,544

(22) Filed: Apr. 15, 2002

(65) Prior Publication Data

US 2003/0196088 A1    Oct. 16, 2003

(51) Int. Cl.
H04L 9/00 (2006.01)
(52) U.S. Cl. .................... 713/200; 713/201
(58) Field of Classification Search ............ 713/200, 713/201
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |
| 4,759,064 A | 7/1988 | Chaum |
| 4,795,893 A | 1/1989 | Ugon |
| 4,802,084 A | 1/1989 | Ikegaya et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |

(Continued)

FOREIGN PATENT DOCUMENTS

DE    4217444    10/1992

(Continued)

OTHER PUBLICATIONS

Brands, Stefan, "Restrictive Blinding of Secret-Key Certificates", *Springer-Verlag* XP002201306, (1995),Chapter 3.

(Continued)

*Primary Examiner*—Thomas R. Peeso
(74) *Attorney, Agent, or Firm*—Murthy S. K.

(57) ABSTRACT

A method and apparatus to communicate with a token using a previously reserved binary number in the start field of a cycle, wherein the cycle is not echoed on any bus other than the bus through which the communication is received.

32 Claims, 6 Drawing Sheets

U.S. PATENT DOCUMENTS

| | | |
|---|---|---|
| 5,287,363 A | 2/1994 | Wolf et al. |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,437,033 A | 7/1995 | Inoue et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,845 A | 8/1998 | Serikawa et al. |
| 5,805,712 A | 9/1998 | Davis |
| 5,809,546 A | 9/1998 | Greenstein et al. |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,872,994 A | 2/1999 | Akiyama et al. |
| 5,890,189 A | 3/1999 | Nozue et al. |
| 5,892,900 A * | 4/1999 | Ginter et al. ............... 713/200 |
| 5,901,225 A | 5/1999 | Ireton et al. |
| 5,919,257 A | 7/1999 | Trostle |
| 5,935,242 A | 8/1999 | Madany et al. |
| 5,935,247 A | 8/1999 | Pai et al. |
| 5,935,249 A * | 8/1999 | Stern et al. ................ 713/201 |
| 5,937,063 A | 8/1999 | Davis |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster et al. |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |

| | | | |
|---|---|---|---|
| 2002/0023032 | A1 | 2/2002 | Pearson et al. |
| 2002/0147916 | A1 | 10/2002 | Strongin et al. |
| 2002/0166061 | A1 | 11/2002 | Falik et al. |
| 2002/0169717 | A1 | 11/2002 | Challener |
| 2003/0018892 | A1 | 1/2003 | Tello |
| 2003/0074548 | A1 | 4/2003 | Cromer et al. |
| 2003/0115453 | A1 | 6/2003 | Grawrock |
| 2003/0126442 | A1 | 7/2003 | Glew et al. |
| 2003/0126453 | A1 | 7/2003 | Glew et al. |
| 2003/0159056 | A1 | 8/2003 | Cromer et al. |
| 2003/0188179 | A1 | 10/2003 | Challener et al. |
| 2003/0196085 | A1 | 10/2003 | Lampson et al. |

FOREIGN PATENT DOCUMENTS

| | | |
|---|---|---|
| EP | 0473913 | 3/1992 |
| EP | 0600112 A1 | 8/1994 |
| EP | 0892521 | 1/1999 |
| EP | 0930567 A3 | 7/1999 |
| EP | 0961193 | 10/1999 |
| EP | 0965902 | 12/1999 |
| EP | 1 030 237 A | 8/2000 |
| EP | 1055989 | 11/2000 |
| EP | 1056014 | 11/2000 |
| EP | 1085396 | 3/2001 |
| EP | 1146715 A1 | 10/2001 |
| EP | 1271277 | 1/2003 |
| JP | 02000076139 A | 3/2000 |
| WO | WO9524696 | 9/1995 |
| WO | WO 97/29567 | 8/1997 |
| WO | WO9812620 | 3/1998 |
| WO | WO 98/34365 | 8/1998 |
| WO | WO98/44402 | 10/1998 |
| WO | WO99/05600 | 2/1999 |
| WO | WO99/09482 | 2/1999 |
| WO | WO9918511 | 4/1999 |
| WO | WO99/57863 | 11/1999 |
| WO | WO99/65579 | 12/1999 |
| WO | WO0021238 | 4/2000 |
| WO | WO00/62232 | 10/2000 |
| WO | WO 01/27723 A | 4/2001 |
| WO | WO 01/27821 A | 4/2001 |
| WO | WO0163994 | 8/2001 |
| WO | WO 01 75564 A | 10/2001 |
| WO | WO 01/75565 | 10/2001 |
| WO | WO 01/75595 | 10/2001 |
| WO | WO 02/03196 A2 | 1/2002 |
| WO | WO0201794 | 1/2002 |
| WO | WO 02 17555 A | 2/2002 |
| WO | WO 02/27658 A2 | 4/2002 |
| WO | WO02060121 | 8/2002 |
| WO | WO 02 086684 A | 10/2002 |
| WO | WO 03/058412 A2 | 7/2003 |
| WO | WO03058412 | 7/2003 |
| WO | WO 03/073245 A2 | 9/2003 |
| WO | WO 03/085497 A2 | 10/2003 |

OTHER PUBLICATIONS

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", *IEEE AES Systems Magazine*, XP002190614,(Mar. 1999).

Menezes, Oorschot, "Handbook of Applied Cryptography", *CRC Press LLC*, USA XP002201307, (1997),475.

Richt, Stefan , et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Saez, Sergio , et al., "A Hardware Scheduler for Complex Real-Time Systems", *Proceedings of the IEEE International Symposium on Industrial Electronics*, XP002190615,(Jul. 1999),43-48.

Sherwood, Timothy , et al., "Patchable Instruction ROM Architecture", *Department of Computer Science and Engineering*, University of California, San Diego, La Jolla, CA, (Nov. 2001).

"Information Display Technique for a Terminate Stay Resident Program," IBM Technical Disclosure Bulletin, TDA-ACC-No. NA9112156, Dec. 1, 1991, pp. 156-158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Heinrich, J., "MIPS R4000 Microprocessor User's Manual," 1994, MIPS Technology, Inc., Mountain View, CA, pp. 67-79.

Heinrich, J. "MIPS R4000 Microprocessor User's Manual," Apr. 1, 1993, MIPS, Mt. View, XP002184449, pp. 61-97.

Heinrich, J., "MIPS R4000 Microprocessor User's Manual, "Apr. 1, 1993, MIPS, Mt. View, XP002184449, pp. 61-97.

"M68040 User's Manual," 1993, Motorola, INC., pp. 1-20.

"Intel 386 DX Microprocessor 32-Bit CHMOS Microprocessor with Integrated Memory Management," Dec. 31, 1995, Intel, Inc., pp. 32-56; figures 4-14.

Berg, C., "How Do I Create A Signed Applet?," Dr. Dobb's Journal, M&T Publ., Redwood City, CA, US, vol. 22, No. 8, Aug. 1997, pp. 109-111, 122.

Gong, L., et al., "Going Beyond The Sandbox: An Overview Of The New Security Architecture In The Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Aug. 9, 2001; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors* (ICCD '86), (Oct. 6, 1986), 155-160.

Fabry, R.S., "Capability-Based Addressing", Fabry, R.S., *"Capability-Based Addressing," Communications on the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", Wiley, John & Sons, Inc., XP002939871; ISBN 0471117099,(Oct. 1995),47-52.

Schneier, Bruce, "Applied Cryptography: Protocols, Algorithm, and Source Code in C", Wiley, John & Sons, Inc., XP002138607; ISBN 0471117099,(Oct. 1995),56-65.

Schneier, Bruce, "Applied Cryptography: Protocols, Algorithms, and Source Code C", Wiley, John & Sons, Inc., XP0021111449; ISBN 0471117099,(Oct. 1995), 169-187.

Schneier, Bruce, "Applied Cryptography: Protocols, Algorithms, and Source Code in C", *2nd Edition*; Wiley, John & Sons, Inc., XP002251738; ISBN 0471128457,(Nov. 1995),28-33; 176-177; 216-217; 461-473; 518-522.

* cited by examiner ated 1 Dec. 2001
METHOD AND APPARATUS FOR COMMUNICATING SECURELY WITH A TOKEN

BACKGROUND

The Trusted Platform Computing Alliance (TPCA) in the TPCA's Main Specification, Version 1.1a, dated 1 Dec. 2001 describes a Trusted Platform Module (TPM) or token that provides increased confidence and that enables enhancements of existing services and new services. The token supports auditing and logging of software processes, platform boot integrity, file integrity, and software licensing. The token provides a protected information store for the platform (e.g., a personal computer), and can be used to attest to the identity of the platform as defined by the hardware that is present (e.g. processors, chipsets, firmware, etc.) on the platform. The secure features of the token encourage third parties to grant the platform access to information that would otherwise be denied.

The token contains an isolated computing engine whose processes can be trusted because they cannot be altered. These processes and the binding of the subsystem to the platform combine to reliably measure and report the state of the main computing environment inside the platform. The token provides a root of trust for the booting of the platform. A local or remote entity may query the token to reliably obtain security information and decide whether the platform's behavior enables it to be trusted for the intended purpose. Confidence in the loading of software is improved, because the token can attest to the current state of the operating system.

The token may include several registers, that may be used to store encrypted digests of files, including software programs, which may be retrieved and authenticated. Information written to and read from the token is to be secure in order for third parties to trust the platform. The mapping of the registers as traditional Input/Output (I/O) mapped registers is undesirable as a device on the same interface as the token may be programmed to map to the same I/O addresses, thereby compromising the security of the token.

BRIEF DESCRIPTION OF THE DRAWINGS

One or more embodiments of the present invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

Described is a method and apparatus for communicating securely with a token. In the following description, numerous specific details such as communication protocols, types and interrelationships of system components etc. are set forth in order to provide a thorough understanding of the one or more embodiments of the present invention. It will be apparent, however, to one of ordinary skill in the art that the one or more embodiments of the present invention may be practiced without these specific details. In other instances, well-known architectures, control structures, gate level circuits and full software instruction sequences and techniques have not been shown to avoid unnecessarily obscuring this description. Those of ordinary skill in the art, with the included description, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to effect such feature, structure, or characteristic in connection with other embodiments whether or not explicitly described.

In the following description and claims, the terms "coupled" and "connected", along with derivatives such as "communicatively coupled" may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Parts of the description are presented using terminology commonly employed by those of ordinary skill in the art to convey the substance of their work to others of ordinary skill in the art. Also, parts of the description will be presented in terms of operations performed through the execution of programming instructions. As well understood by those of ordinary skill in the art, these operations often take the form of electrical, magnetic, or optical signals capable of being stored, transferred, combined, and otherwise manipulated through, for instance, electrical components.

Figure 1:
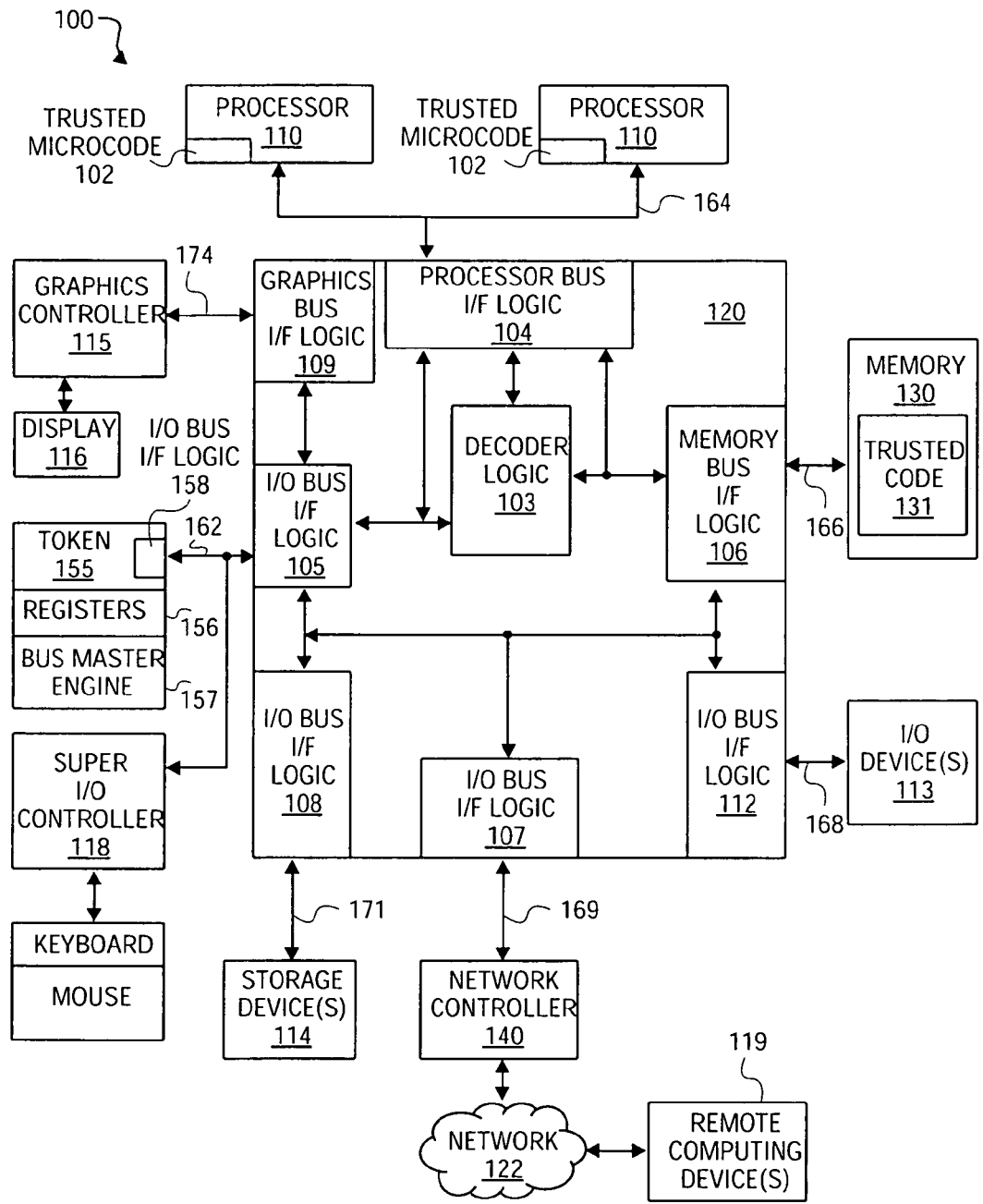
FIG. 1 illustrates a computing device comprising a token according to one embodiment of the invention.

FIG. 1 illustrates a computing device comprising a token according to one embodiment of the invention. An example computing device 100 shown in FIG. 1 may comprise one or more processors 110, a chipset 120, and a token 155.

The processors 110 may support one or more operating modes such as, for example, a real mode, a protected mode, a virtual 8086 mode, and/or a virtual machine mode (VMX mode). Further, the processors 110 may support one or more privilege levels or rings in each of the supported operating modes. In general, the operating modes and privilege levels of a processor 110 define the instructions available for execution and the effect of executing such instructions. More specifically, a processor 110 may be permitted to execute certain privileged instructions only if the processor 110 is in an appropriate mode and/or privilege level. In one embodiment of the invention, a processor 110 may comprise a microcode memory 102 to store trusted microcode.

Processors 110 are coupled to chipset 120 via a processor bus 164. Although FIG. 1 illustrates two processors 110 connected to chipset 120 via a common processor bus 164, alternate embodiments of the invention may have multiple processors 110 with each processor 110 connected to chipset 120 directly by, e.g., a point-to-point processor bus. In one embodiment of the invention, the processor bus 164 is a front side bus (FSB) as used with Intel® corporation's Pentium 4 processor. Chipset 120 may comprise one or more integrated circuit packages or chips.

In one embodiment of the invention chipset 120 includes processor bus interface (I/F) logic 104 coupled between processor bus 164 and decoder logic 103. In one embodiment of the invention, chipset 120 includes memory bus interface logic 106 to couple the chipset 120 to a memory 130 via a memory bus 166. In one embodiment of the invention, memory 130 includes trusted code 131. In one embodiment of the invention, trusted code 131 may be program code and/or data that is authenticated by a processor 110 and stored as trusted code 102 in a processor 110.

In one embodiment of the invention, chipset 120 includes Input/Output (I/O) bus interface logic 112 connected to I/O devices 113 via, e.g., I/O bus 168. A second I/O bus interface logic 107 couples chipset 120 to a network controller 140 using, e.g., I/O bus 169.

In one embodiment of the invention, network controller 140 connects computing device 100 to one or more remote computing devices 119 via a network 122. For example, network controller 140 may comprise a 10 Mb or 100 Mb Ethernet controller, a cable modem, a digital subscriber line (DSL) modem, plain old telephone service (POTS) modem, etc. to couple the computing device 100 to one or more remote computing devices 119.

A third I/O bus interface logic 108 couples chipset 120 to one or more storage devices 114 using, e.g., a I/O bus 171. A graphics bus interface logic 109 couples chipset 120 to a graphics controller 115 via a graphics bus 174. Graphics controller 115 is coupled to display device 116.

I/O bus I/F logic 105 couples chipset 120 to token 155 using an I/O bus 162. In one embodiment of the invention, I/O bus 162 may be a low pin count (LPC) bus. Token 155 comprises one or more registers 156, bus master engine 157, and I/O bus interface logic 158. Also connected to I/O bus 162 is a super I/O controller 118 that is coupled to, e.g., a keyboard, a mouse etc.

Figure 2:
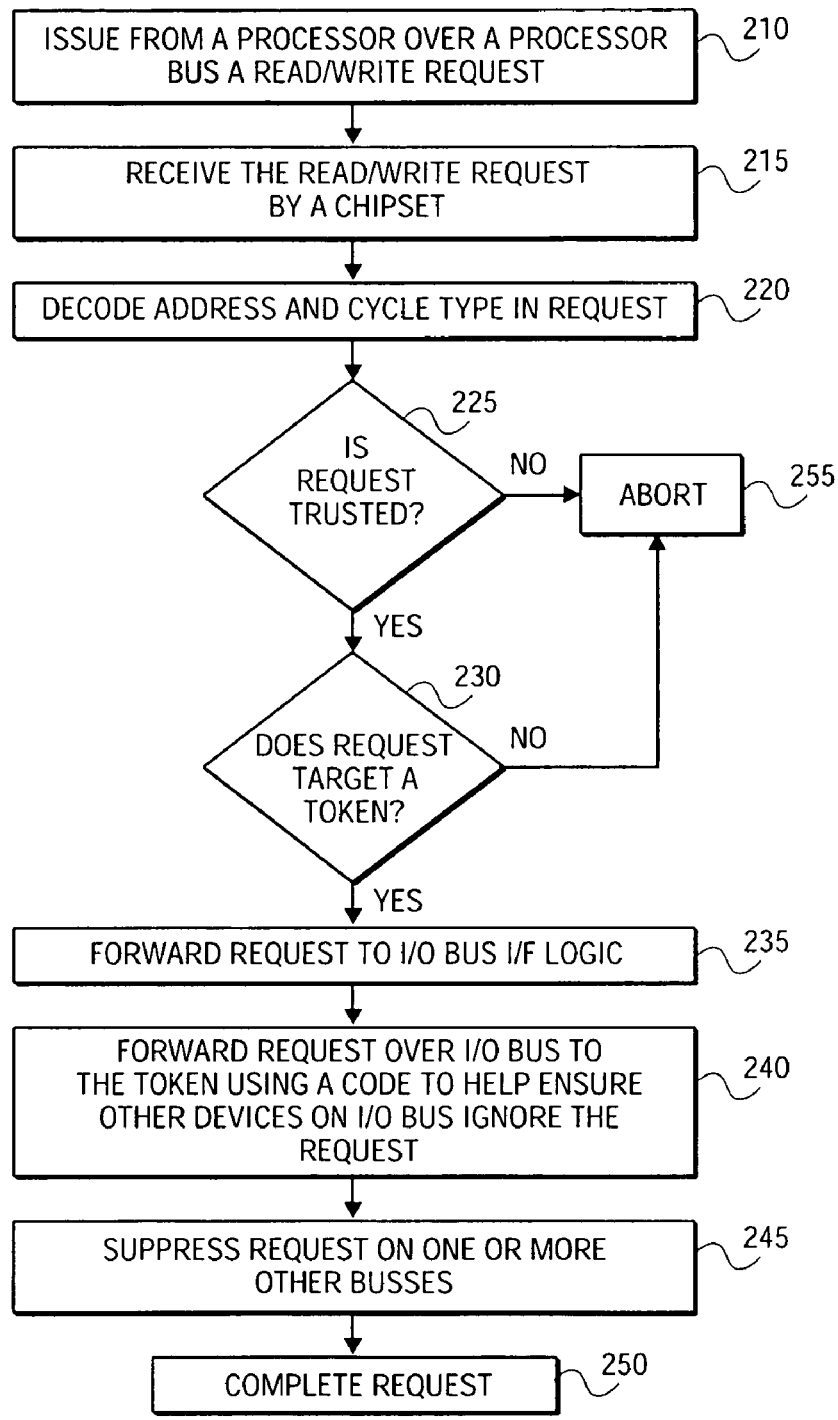
FIG. 2 illustrates a flow diagram for communicating with a token according to one embodiment of the invention.

FIG. 2 illustrates a flow diagram for communicating with a token according to one embodiment of the invention. As FIG. 2 illustrates, at 210 a processor 110 issues a read or write request to chipset 120. At 215, chipset 120 receives the request from processor 110 via processor bus 164. At 220, chipset 120 decodes the address in the request. In one embodiment of the invention, in addition to decoding the address the chipset 120 decodes the cycle type in the request. At 225, the processor bus I/F logic 104 determines whether the request is a trusted request. In one embodiment of the invention, the processor bus I/F logic 104 determines this by determining whether the decoded address is within the trusted configuration space, and by determining whether a value in a request identity field in the request is a value that indicates the request is a trusted request. If the request is not a trusted request, at 225, the chipset 120 aborts the request.

At 230 the processor bus I/F logic 104 determines whether the request targets token 155. If the processor bus I/F logic 104 determines that the request targets token 155 e.g., by determining the offset range is within the specified range, at 235 the processor bus I/F logic 104 forwards the request to the I/O bus I/F logic 105. If the request does not target the token 155, at 255, the chipset 120 aborts the request. At 240, the I/O bus I/F logic 105 forwards the request over I/O bus 162 to I/O bus interface logic 158. In one embodiment of the invention, the I/O bus interface logic 158 uses a token cycle that includes a code that ensures that other devices on the I/O bus ignore the forwarded request. In one embodiment of the invention, the code comprises a reserved binary number that is ignored by other devices on the I/O bus 162. At 245, when forwarding the request using the code the I/O bus I/F logic 105 ensures that information in the request is suppressed on one or more other busses except on the I/O bus 162. In one embodiment of the invention, the information in the request may be suppressed by sending false data on one or more busses other than the I/O bus 162 to suppress information from the request echoed on one or more other busses. In one embodiment of the invention, both the address and the data contained in the echoed code may be distorted e.g., by writing a series of invalid bits in the address and data fields. At 250, the request is completed.

Referring to FIG. 1, in one embodiment of the invention, processor bus interface (I/F) logic 104 comprises buffers and logic circuits to receive a trusted cycle (e.g., a read, or a write cycle) from a processor 110. In one embodiment of the invention, the processor bus I/F logic 104 identifies the trusted cycle by identifying a unique value in a field in the trusted cycle. In addition, the trusted cycle may address a location in a trusted configuration space.

In one embodiment of the invention, a trusted cycle may comprise a standard memory read or write cycle to the configuration space provided that the chipset 120 has been preprogrammed to allow standard memory read or write cycles. In one embodiment of the invention, the preprogramming of the chipset 120 is done using a trusted memory cycle to execute the program that preprograms the chipset 120.

The processor bus I/F logic 104 sends the trusted cycle to decoder logic 103. Decoder logic 103 decodes the trusted cycle and determines whether the address in the trusted cycle is a valid address in token 155. If the address in the trusted cycle is a valid address in token 155, the trusted cycle or the information in the trusted cycle is sent to I/O bus I/F logic 105. However, if the address in the trusted cycle is not a valid address, in one embodiment of the invention, the decoder logic 103 may inform the processor bus I/F logic 104 to abort the trusted cycle. However, if the processor bus I/F logic 104 has already received the entire trusted cycle, the processor bus I/F logic 104 discards the trusted cycle if the decoded address is not a valid address. In other embodiments of the invention the processor bus I/F logic 104 may return some arbitrary data, e.g., a series of 0's or 1's or may reset computing device 100. Other processor cycles may also be received by processor bus interface logic 104 e.g., a non trusted memory cycle or a non trusted I/O.

Processor bus I/F logic 104 may be coupled to other bus interface logic e.g., to memory bus I/F logic 106. So also the other bus I/F logic may be connected to each other via busses in order to communicate with each other and to communicate between the different peripherals connected to the bus I/F logic as needed. When non trusted processor cycles are received by processor bus interface logic 104, they are analyzed by the processor bus interface logic 104 and sent to the appropriate bus interface logic. In addition, the processor bus interface logic 104 may respond to the processor 110 from which the trusted cycle or other processor cycles are received with appropriate acknowledgment replies, data cycles, or other cycles.

When I/O bus I/F logic 105 receives the trusted cycle, or the information therein, the I/O bus I/F logic 105 generates a token cycle (i.e., a token read cycle or a special write cycle). In one embodiment of the invention, in order to prevent snooping by bus devices e.g., bus adapters, the token cycle to the token 155 is not to appear on one or more busses other than the I/O bus 162. For example, the token cycle is not to appear on I/O bus 168, I/O bus 169 or I/O 171. In one embodiment of the invention, the token cycle that is generated by the I/O bus interface logic 105 is encoded such that other devices on the I/O bus 162, e.g., the super I/O controller 118 ignore the information contained in the token cycle. In one embodiment of the invention, the I/O bus interface logic 105 receives the trusted cycle and while generating the token cycle sends false data or distorted data on one or more other busses to prevent any information of the token cycle from being echoed and therefore observed on another bus. Only the token cycle sent to token 155, and in particular the I/O bus 162, has the information received from processor bus interface logic 104. So also the information retrieved from token 155 is sent only to processor 110 via processor bus 164. Other busses connected to chipset 120 either do not receive the data, or receive erroneous data. In one embodiment of the invention, I/O bus I/F logic 158 on token 155 receives the data from chipset 120 and writes the data to the appropriate registers in token 155. In other embodiments of the invention, I/O bus I/F logic 158 returns the data requested by token read cycles from chipset 120.

Figure 5:
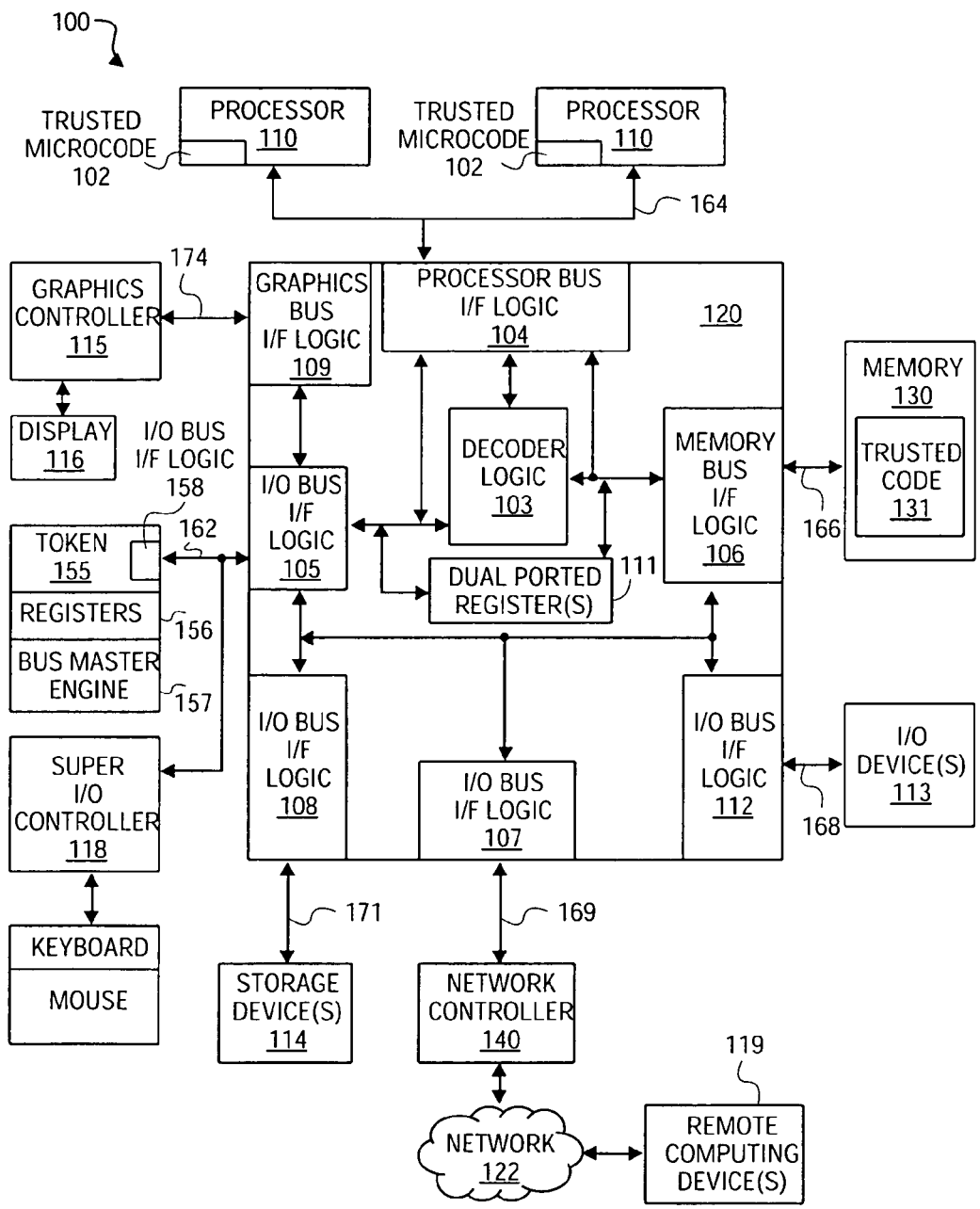
FIG. 5 illustrates a computing device comprising a chipset with a dual ported register according to one embodiment of the invention.
Figure 6:
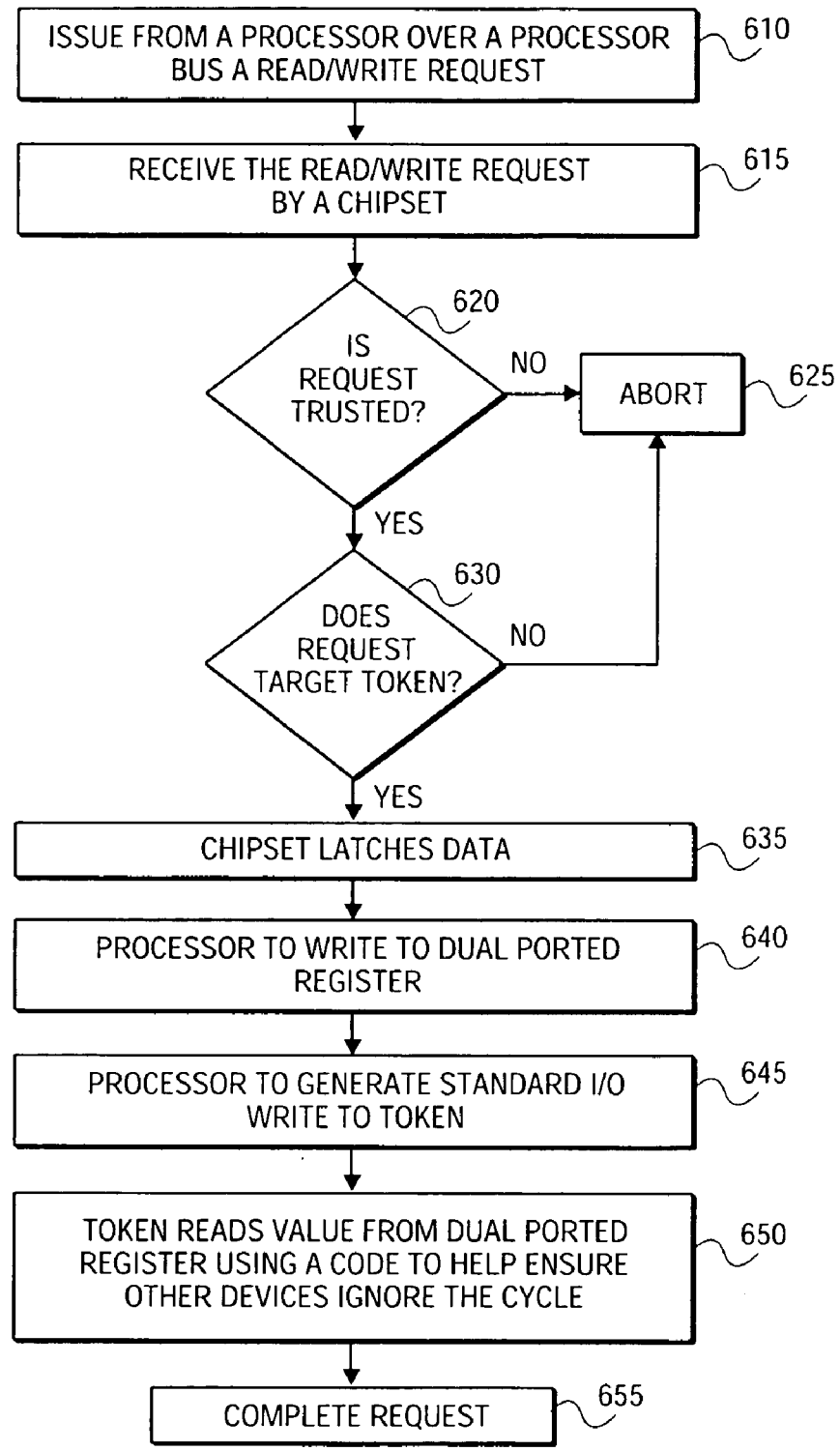
FIG. 6 illustrates a flow diagram for writing to a token using dual ported registers according to one embodiment of the invention.

FIG. 5 illustrates a computing device comprising a chipset with a dual ported register according to one embodiment of the invention. In one embodiment of the invention, chipset 120 comprises dual ported registers 111 that couples processor bus I/F logic 104 to I/O bus I/F logic 105. FIG. 6 illustrates a flow diagram for writing to a token using the dual ported registers according to one embodiment of the invention. As illustrated in the embodiment of FIG. 6 at 610 a processor 110 issues a read or write request to chipset 120. At 615, chipset 120 receives the request from processor 110 via processor bus 164. In one embodiment of the invention, after receiving the request from processor 110 chipset 120 decodes the address in the request. In one embodiment of the invention, in addition to decoding the address the chipset 120 decodes the cycle type in the request. At 620, the processor bus I/F logic 104 determines whether the request is a trusted request. In one embodiment of the invention, the processor bus I/F logic 104 determines this by determining whether the decoded address is within the trusted configuration space, and by determining whether a value in a request identity field in the request is a value that indicates the request is a trusted request. If the request is not a trusted request, at 625, the chipset 120 aborts the request. At 630 the processor bus I/F logic 104 determines whether the request targets token 155. If the processor bus I/F logic 104 determines that the request targets token 155 e.g., by determining the offset range is within the specified range, at 635 the chipset 120 latches the data in the request. If the request does not target the token 155, at 625, the chipset 120 aborts the request. At 640, the processor 110 may write to the dual ported registers 111 one or more values for token 155 using for example a standard write transaction. At 645, the processor 110 may then generate a standard I/O write to the token 155, informing the token 155 to fetch the one or more values from the dual ported registers 111 in chipset 120. At 650, the token 155 may become an I/O bus master (using the bus master engine 157) and read the one or more values, written by the processor 110, from dual ported registers 111. In one embodiment of the invention, the token 155 reads the one or more values from the dual ported registers 111 using a code to help ensure that other devices on the I/O bus 162 ignore the token's read cycle. In one embodiment of the invention, the code comprises a reserved binary number that is ignored by other devices on the I/O bus 162. The read values are then stored by I/O bus I/F logic 158 to registers 156 in token 155. At 655 the request is completed.

Figure 7:
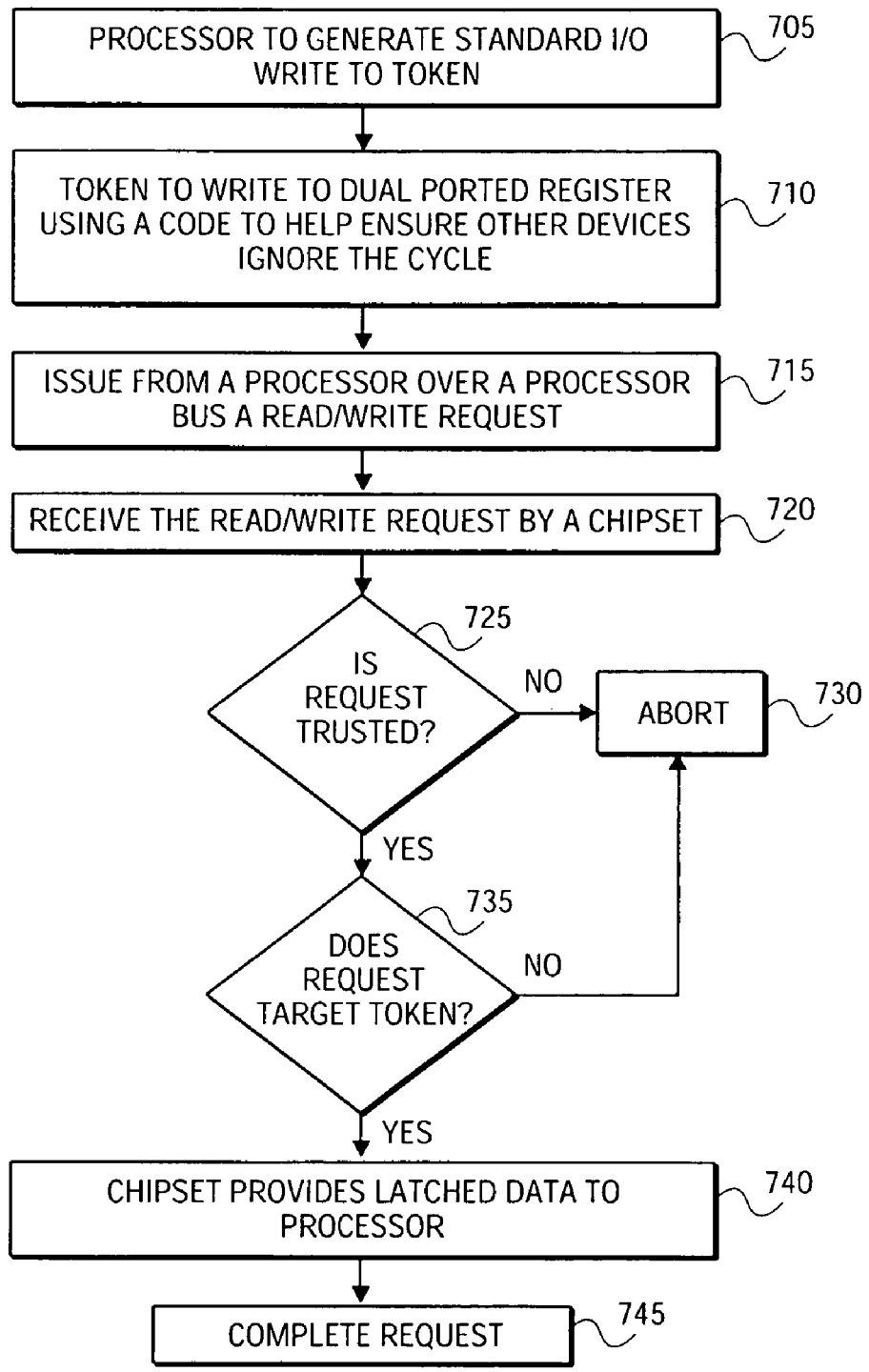
FIG. 7 illustrates a flow diagram for reading from a token using dual ported registers according to one embodiment of the invention.

FIG. 7 illustrates a flow diagram for reading from a token using a dual ported register according to one embodiment of the invention. As illustrated in the embodiment of FIG. 7, at 705, a processor 110 may generate a standard I/O write to token 155, informing the token 155 to write one or more values to dual ported registers 111. At 710, token 155 may become an I/O bus master (using the bus master engine 157) and write one or more values to dual ported registers 111. In one embodiment of the invention, the I/O bus interface logic 158 uses a token cycle that includes a code that ensures that other devices on the I/O bus 162 ignore the write cycle. In one embodiment of the invention, the code comprises a reserved binary number that is ignored by other devices on the I/O bus 162. At 715, the processor 110 issues a read or write request to chipset 120. At 720, chipset 120 receives the request from the processor 110 via processor bus 164. In one embodiment of the invention, after receiving the request from processor 110 chipset 120 may decode the address in the request. In one embodiment of the invention, in addition to decoding the address the chipset 120 decodes the cycle type in the request. At 725, the processor bus I/F logic 104 determines whether the request is a trusted request. In one embodiment of the invention, the processor bus I/F logic 104 determines this by determining whether the decoded address is within the trusted configuration space, and by determining whether a value in a request identity field in the request is a value that indicates the request is a trusted request. If the request is not a trusted request, at 730, the chipset 120 aborts the request. At 735, the processor bus I/F logic 104 determines whether the request targets token 155. If the processor bus I/F logic 104 determines that the request targets token 155 e.g., by determining the offset range is within the specified range, at 740 the chipset 120 provides the latched data to processor 110. If the request does not target the token 155, at 730, the chipset 120 aborts the request. At 740 the chipset 120 provides the latched data in the dual ported registers 111 to the processor 110. At 745 the request is completed.

The interfaces and peripherals connected to chipset 120 may have architecture different from that shown in FIG. 1. In one embodiment of the invention, a memory hub (MCH) comprises the memory bus interface logic 106 that couples memory 130 to the chipset 120. The MCH may include the graphics bus interface logic 109 that connects graphics controller 115 or an accelerated graphics port (AGP) (not shown). Also coupled to the MCH may be an I/O controller hub (ICH). The ICH may include the I/O bus interface logic 105, and a plurality of I/O bus interface logic to connect the ICH to a plurality of I/O devices. In the architecture described above all processor 110 cycles bound for the ICH are received by the MCH and decoded. The MCH forwards configuration space cycles (i.e., trusted cycles) to the ICH for address ranges that do not correspond to registers in the MCH. In one embodiment of the invention, the address ranges that do not correspond to registers in the MCH are address ranges for token 155.

In one embodiment of the invention, the processor 110 trusted cycles for token 155 are normal memory read and write cycles with addresses that match the addresses on the processor bus 164 (i.e., with addresses within a trusted configuration space). In one embodiment of the invention, the ICH ignores memory read and write cycles that address the trusted configuration space but originate from other than the MCH. For example, if a memory read cycle originates from a peripheral component interconnect (PCI) bus with an address in the trusted configuration space, the memory read cycle is ignored by the ICH.

Figure 3:
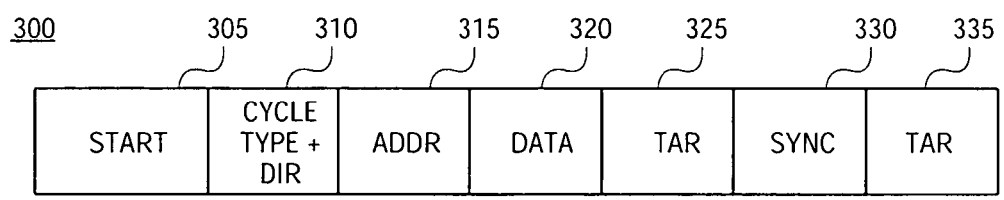
FIG. 3 illustrates a token write cycle according to one embodiment of the invention.

FIG. 3 illustrates a token write cycle on I/O bus according to one embodiment of the invention. In one embodiment of the invention, a token write cycle 300 on I/O bus 162 is used to write information from processor 110 to token 155. In one embodiment of the invention, the token write cycle 300 is a LPC write cycle. The token write cycle comprises a start field 305, cycle type+dir field 310, address (ADDR) field 315, data field 320, turn around (TAR) field 325, synchronous (sync) field 330, and a second turn around (TAR) field 335. However, in order to send the information received from, e.g., the processors 110 or from the processor bus I/F logic 104 to the token 155, the reserved bits in the start field 305 may be used. In one embodiment of the invention, the start field 305 may comprise reserved binary bits (binary numbers) in the range 0100–1110 and may be used to write to token 155. The reserved binary numbers in the start field of the token write cycle 300 are received only by the token 155 on I/O bus 162, and are ignored by other devices e.g., the super I/O controller 118 connected to the I/O bus 162. In one embodiment of the invention, if the other devices on the I/O bus 162 receive the start bits, as soon as the start bits are decoded by the other devices to indicate a reserved binary number, remainder of the token write cycle is ignored. Thus only the token 155 on the I/O bus 162 receives the data from processor 110. Although the embodiment described above uses the reserved bits in the start field of the LPC write cycle, other embodiments may use any other standard that has reserved bits in the start field.

The I/O bus has one control line LFRAME# (not shown) that is used by the chipset 120 to start or stop the transfer of information to and from the token 155. In particular, the LFRAME# signal is asserted during the start field 305 of the token write cycle 300. The chipset 120, and in particular, the I/O bus interface logic 105 may drive data on the token write cycle 300, and then turn the bus around to monitor the token 155 for completion of the cycle. After sending the sync signal 330, the token 155 may then turn the bus around to the chipset 120, ending the cycle.

In one embodiment of the invention the start field 305 indicates the start or stop of a token write cycle 300. All peripherals including token 155 may go to a state that monitors the I/O bus 162 when LFRAME# is active. While LFRAME# is active, the start field 305 may take on many values. Generally, the start field 305 indicates a device number for bus masters, or "start/stop" indication for non-bus master cycles. Normally, peripherals ignore the data being transmitted if a reserved field e.g., 0001 or 0100–1100 is observed, and the data transmitted with the token write cycle 300 is ignored. However, in order to ensure locality wherein the path is guaranteed from e.g., the chipset 120 to the token 155 a reserved binary number is used by the chipset 120 in the start field 305. When token 155 decodes the reserved binary numbers in the start field it responds to the token write cycle 300, and may write the data contained in the token write cycle 300 to one or more of the registers in token 155. Therefore, when the token 155 decodes a start field with e.g., 0101 (a reserved binary number) it responds to the information being transmitted in the token write cycle 300.

Figure 4:
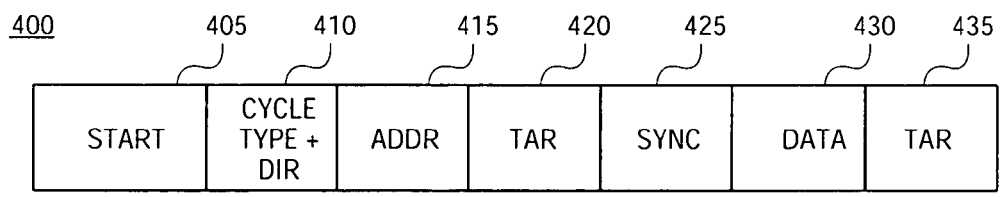
FIG. 4 illustrates a token read cycle according to one embodiment of the invention.

FIG. 4 illustrates a token read cycle on I/O bus according to one embodiment of the invention. In one embodiment of the invention, a token read cycle 400 on I/O bus 162 is used to read information from token 155. The token read cycle 400 comprises a start field 405, cycle type+dir field 410, address (ADDR) field 415, turn around (TAR) field 420, synchronous (sync) field 425, a data field 430, and a second turn around (TAR) field 435. However, in order to read information from the token 155, the reserved bits in the start field 405 may be used. In one embodiment of the invention, the start field 405 may comprise reserved binary bits (binary numbers) in the range 0100–1110 or the binary number 0001, and may be used to read token 155. The reserved binary numbers in the start field of the token read cycle 400 are received only by the token 155 on I/O bus 162, and are ignored by other devices e.g., the super I/O controller 118 connected to the I/O bus 162. In one embodiment of the invention, if the other devices on the I/O bus 162 receive the start bits, as soon as the start bits are decoded by the other devices to indicate a reserved binary number, remainder of the token write cycle is ignored. Thus, only the token 155 on the I/O bus 162 receives the read instruction from processor 110.

The I/O bus 162 has one control line LFRAME# (not shown) that is used by the chipset 120 to start or stop the transfer of information to and from the token 155. In particular, the LFRAME# signal is asserted during the start field 505 of the token read cycle 500. The chipset 120, and in particular, the I/O bus interface logic 105 may drive address information on the token read cycle 400, and then turn the bus around to monitor the token 155 for the requested data and the completion of the cycle. After sending the sync signal 425, the token 155 may then send the requested data 430, and turn the bus around to the chipset 120, ending the cycle. Although the embodiment described above uses the reserved bits in the start field of the LPC read cycle, other embodiments may use any other standard that has reserved bits in the start field.

In one embodiment of the invention the start field 405 indicates the start or stop of a token read cycle 400. All peripherals including token 155 may go to a state that monitors the I/O bus 162 when LFRAME# is active. While LFRAME# is active, the start field 405 may take on many values. Generally, the start field 405 indicates a device number for bus masters, or "start/stop" indication for non-bus master cycles. Normally, peripherals ignore the data being transmitted if a reserved field e.g., 0001 or 0100–1100 is observed, and the data transmitted with the token read cycle 400 is ignored. However, in order to ensure locality wherein the path is guaranteed from e.g., the chipset 120 to the token 155 a reserved binary number is used by the chipset 120 in the start field 405. When token 155 decodes the reserved binary numbers in the start field it responds to the token read cycle 400, and obtain data from one or more registers in token 155 and encodes the data in the data field in token read cycle 400. Therefore, when the token 155 decodes a start field with e.g., 0101 (a reserved binary number) it responds to the information requested in the token read cycle 400.

Thus, a method and apparatus have been disclosed to communicate securely with the token, wherein the information sent and received from the token is present only on the processor bus and the I/O bus. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:
   a processor coupled to a first bus to issue a trusted request;
   a token; and
   a chipset coupled to the processor by the first bus, said chipset coupled to the token by a second bus, said chipset to decode the trusted request from the processor and to forward the trusted request to the token, said chipset to prevent the trusted request from being echoed on one or more busses other than the second bus.

2. The apparatus of claim 1 wherein the first bus is a front side bus (FSB) and the second bus is a low pin count (LPC) bus.

3. The apparatus of claim 2 wherein the chipset sends false data to the one or more busses other than the second bus.

4. The apparatus of claim 1 wherein the trusted request comprises a request that addresses a trusted configuration space.

5. The apparatus of claim 1 wherein the trusted request is issued in response to the processor executing microcode or trusted code.

6. The apparatus of claim 1 wherein the chipset comprises decoder logic to decode an address in the trusted request.

7. The apparatus of claim 1 further comprising the chipset to encode the trusted request to the token to prevent one or more other devices on the second bus from reading the trusted request.

8. A method comprising:
   sending by a processor a trusted request to a chipset;
   decoding by the chipset the trusted request received from the processor and
   forwarding the trusted request via a bus to a token using a code, said code selected such that other devices on the bus ignore the trusted request.

9. The method of claim 8 further comprising suppressing the request on one or more other busses.

10. The method of claim 8 wherein forwarding the request to the token comprises using reserved bits in the request.

11. A chipset comprising:
    a first interface logic to receive from a processor a trusted request via a first bus;
    a second interface logic coupled to a token via a second bus;
    a decoding logic coupled to the first interface logic and the second interface logic, said first interface logic to decode the trusted request, said first interface logic to determine that the trusted request is a trusted request from the processor, said first interface logic to further determine that the trusted request targets the token; and
    the first interface logic to forward the trusted request to the second interface logic if the trusted request targets the token, said second interface logic to prevent the trusted request from appearing on any bus other than the first bus and the second bus.

12. The chipset of claim 11 wherein the second interface logic sends false data to any bus other than the first bus and the second bus.

13. The chipset of claim 11 further comprising the second interface logic to encode the trusted request to the token to prevent one or more other devices on the second bus from reading the trusted request.

14. A token comprising:
    one or more registers;
    an input/output (I/O) bus interface logic to couple the token to a chipset via a bus, said token to receive a trusted request from the chipset, said trusted request to comprise reserved bits that are ignored by one or more devices on the bus.

15. The apparatus of claim 14 wherein the token comprises a bus master engine.

16. The apparatus of claim 14 wherein the trusted request comprises reserved bits comprising any one of 0001, 0100, 0101, 0110, 0111, 1000, 1001, 1010, 1011, 1100, 1101, and 1110.

17. An apparatus comprising:
    a chipset to generate a low pin count (LPC) cycle to a token on a LPC bus, said LPC cycle comprising a start field comprising any one of 0001, 0100, 0101, 0110, 0111, 1000, 1001, 1010, 1011, 1100, 1101, and 1110.

18. The apparatus of claim 17 wherein the LPC cycle comprises a start field that comprises at least one binary number in the range 0100 to 1110.

19. The apparatus of claim 17 wherein the chipset is to prevent the LPC cycle from appearing on one or more busses other than the LPC bus.

20. The apparatus of claim 17 wherein the token on the LPC bus is a trusted plafform module (TPM).

21. The apparatus of claim 17 wherein the chipset is to cause information contained in the LPC cycle to be invalid if the LPC cycle is present on one or more busses other than the LPC bus.

22. A machine readable medium comprising instructions which in response to being executed results in a computing device to issue a trusted request from a processor to a chipset, and to forward the trusted request via a bus to a token, said trusted request encoded to form an encoded request such that other devices on the bus ignore the encoded request.

23. The machine readable medium of claim 22 wherein said instructions to forward the request via a bus to a token, said request encoded such that other devices on the bus ignore the encoded request includes further instructions to generate a low pin count (LPC) cycle to the token, said LPC cycle comprising a start field comprising anyone of 0001, 0100, 0101, 0110, 0111, 1000, 1001, 1010, 1011, 1100, 1101, and 1110.

24. The machine readable medium of claim 22 wherein the trusted request comprises instructions to address a trusted configuration space in the chipset.

25. The machine readable medium of claim 22 wherein the chipset is to prevent the encoded request from appearing on one or more busses other than the bus.

26. A chipset comprising:
    a dual ported register, said dual ported register to couple a processor to a token, said dual ported register to receive a value for the token from the processor, said processor to write to the token to inform the token to obtain the value from the dual ported register.

27. The chipset of claim 26 further comprising the processor to write to the dual ported register using trusted microcode.

28. The chipset of claim 26 further comprising the processor to write to the token using an input/output write cycle.

29. A method comprising:
   writing, using a trusted cycle, data to a dual ported register; and
   generating a standard Input/Output (I/O) write cycle to a token to inform the token to read the data from the dual ported register.

30. The method of claim 29 further comprising the token to become a bus master to read the data from the dual ported register.

31. A method comprising:
   generating a standard Input/Output (I/O) write cycle to a token to inform the token to write data to a dual ported register; and
   reading, using a trusted cycle, from the dual ported register the data written by the token.

32. The method of claim 31 further comprising the token to become a bus master to write data to the dual ported register.

* * * * *